United States Patent
Nagase et al.

(10) Patent No.: US 8,037,964 B2
(45) Date of Patent: Oct. 18, 2011

(54) ELECTRIC POWER STEERING APPARATUS

(75) Inventors: Shigeki Nagase, Nabari (JP); Takeshi Ueda, Kashiba (JP); Akira Sugimoto, Ohtsuki (JP); Kimihito Chino, Hokuto (JP)

(73) Assignees: JTEKT Corporation, Osaka-shi (JP); Koyo Electronics Industries Co., Ltd., Kodaira-shi (JP)

( * ) Notice: Subject to any disclaimer, the term of this patent is extended or adjusted under 35 U.S.C. 154(b) by 287 days.

(21) Appl. No.: 12/445,743

(22) PCT Filed: Oct. 15, 2007

(86) PCT No.: PCT/JP2007/070065
§ 371 (c)(1),
(2), (4) Date: Apr. 16, 2009

(87) PCT Pub. No.: WO2008/050624
PCT Pub. Date: May 2, 2008

(65) Prior Publication Data
US 2010/0294586 A1    Nov. 25, 2010

(30) Foreign Application Priority Data
Oct. 16, 2006   (JP) .................................. 2006-281332

(51) Int. Cl.
*B62D 5/04* (2006.01)
(52) U.S. Cl. .......... 180/446; 318/139; 318/98; 318/434; 318/663; 701/42; 701/1
(58) Field of Classification Search ........... 180/446; 318/138, 254, 434, 439, 663; 701/42, 1; 363/98
See application file for complete search history.

(56) References Cited

U.S. PATENT DOCUMENTS

| | | | | |
|---|---|---|---|---|
| 3,671,826 A * | 6/1972 | Newell | ........................... | 318/696 |
| 4,634,941 A * | 1/1987 | Klimo | ........................... | 318/139 |
| 7,109,742 B2 * | 9/2006 | de Larminat et al. | ......... | 324/107 |
| 2005/0231172 A1 | 10/2005 | Kato et al. | | |

FOREIGN PATENT DOCUMENTS

| | | |
|---|---|---|
| EP | 0 488 240 A1 | 6/1992 |
| JP | 62 77887 | 4/1987 |
| JP | 4 229087 | 8/1992 |
| JP | 7-33033 A | 2/1995 |
| JP | 7 123725 | 5/1995 |
| JP | 2004 330877 | 11/2004 |
| JP | 2006 21645 | 1/2006 |

* cited by examiner

*Primary Examiner* — Tony H. Winner
*Assistant Examiner* — Jacob Knutson
(74) *Attorney, Agent, or Firm* — Oblon, Spivak, McClelland, Maier & Neustadt, L.L.P.

(57) ABSTRACT

When stopping operation of an electric power steering apparatus, a motor relay is kept in an on-state even after a power supply relay is in an off-state. A drive control portion sets a target value of a d-axis current to a value other than zero and sets a target value of a q-axis current to zero, and performs a processing same as that at the time of rotating a motor. MOS-FETs contained in a motor driving circuit are controlled such that each of driving currents of the two phases or more is not zero and the brushless motor does not rotate even supplied with these driving currents. Electric charge accumulated in a capacitor is discharged via the MOS-FETs each in an on-state, a motor relay and the windings of the brushless motor. The electric charge accumulated in the capacitor may be discharged via the excitation coil of the motor relay.

6 Claims, 4 Drawing Sheets

ELECTRIC POWER STEERING APPARATUS

TECHNICAL FIELD

The present invention relates to an electric power steering apparatus which applies a steering assist power to the steering mechanism of a vehicle.

BACKGROUND ART

Conventionally, electric power steering apparatuses are employed in each of which an electric motor is driven in accordance with a steering torque applied to a steering wheel by a driver to thereby apply a steering assist power to the steering mechanism of a vehicle. Although brush motors have been widely employed as the electric motors of the electric power steering apparatuses, in recent years brushless motors are also employed in view of the improvement of reliability and durability and the reduction of inertia etc.

FIG. 4A is a circuit diagram of a motor control circuit contained an electric power steering apparatus of a related art. In FIG. 4A, a three-phase brushless motor 90 is employed in order to generate a steering assist power to be applied to the steering mechanism of a vehicle. Further, a motor driving circuit 93 having six MOS-FETs (Metal Oxide Semiconductor Field Effect Transistors) is employed in order to supply a three-phase driving currents (U-phase current, V-phase current and W-phase current) to the brushless motor 90.

A power supply relay 91 selectively couples a power supply to the motor control circuit. A motor relay 94 selectively couples the motor driving circuit 93 to the brushless motor 90. Each of the power supply relay 91 and the motor relay 94 is turned on when the electric power steering apparatus is operated and turned off when the electric power steering apparatus is stopped.

The six MOS-FETs contained in the motor driving circuit 93 are controlled by a PWM (Pulse Width Modulation) signal output from a drive control portion (not shown), and the motor driving circuit 93 outputs three-phase driving currents which phases differ by $2\pi/3$ from one another and each changes in a sine wave manner. When the brushless motor 90 is driven in this manner by using the PWM signal, the current flowing into the motor driving circuit 93 from the power supply changes largely in a short time and so a current ripple appears. Thus, in order to absorb the current ripple, a capacitor 92 is provided between two power supply lines. The capacitor 92 accumulates electric charge and discharges the electric charge thus accumulated when the current flowing into the motor driving circuit 93 from the power supply is insufficient, whereby the current ripple can be absorbed.

In the electric power steering apparatus of the related art, at the time of stopping the operation thereof, all the six MOS-FETs contained in the motor driving circuit 93 are turned off and thereafter each of the power supply relay 91 and the motor relay 94 is turned off. In this case, it is necessary to discharge the electric charge accumulated in the capacitor 92. To this end, in the motor control circuit shown in FIG. 4(a), a resistor 95 acting as a discharge circuit is provided between the two power supply lines. Thus, the electric charge accumulated in the capacitor 92 is discharged via the resistor 95 after each of the power supply relay 91 and the motor relay 94 is turned off. Alternatively, a circuit formed by connecting the resistor 95 and a switch 96 in series may be provided as the discharge circuit (see FIG. 4B). In the motor control circuit shown in FIG. 4B, the switch 96 is turned on after each of the power supply relay 91 and the motor relay 94 is turned off.

The electric charge accumulated in the capacitor 92 is discharged at the time of turning the power supply off because, at the time of performing a failure inspection of the power supply relay 91 when the power supply is turned on next, the failure inspection cannot be performed correctly if the capacitor 92 still accumulates the electric charge.

The following technique is known as to the motor control circuit of the electric power steering apparatus. A patent document 1 describes that each of three signal lines for supplying a driving current to a three-phase motor is provided with a semiconductor switching element. A patent document 2 discloses an electric power steering apparatus having a motor relay.

[Patent Document 1] JP-A-2006-21645
[Patent Document 2] JP-A-2004-330877

DISCLOSURE OF THE INVENTION

Problems That the Invention is to Solve

As described above, the electric power steering apparatus of the related art is provided with the capacitor for absorbing the current ripple and the circuit for discharging the electric charge accumulated in the capacitor. However, in the case where only the resistor is provided as the discharge circuit (FIG. 4A), since a current flows through the resistor also when the electric power steering apparatus is operated, an amount of the consumption current during the operation of the electric power steering apparatus increases. Although an amount of the consumption current during the operation can be reduced to some extent when a resistor of a large wattage is used, the cost of the electric power steering apparatus increases when such the resistor is used. When the switch is added to the discharge circuit (FIG. 4B), although an amount of the consumption current during the operation does not increase, the size of the circuit increases by an amount corresponding to the switch and so the cost of the electric power steering apparatus increases.

Accordingly, an object of the invention is to provide an electric power steering apparatus of a small-size, low-cost and low power consumption which can discharge electric charge accumulated in a circuit for absorbing a current ripple without using a dedicated circuit.

Means for Solving the Problems

The first invention is characterized by an electric power steering apparatus which is coupled to a power supply in use, comprising:
a motor which generates a steering assist power to be applied to a steering mechanism of a vehicle;
a power supply switch;
a capacitor for absorbing current ripple;
a motor driving circuit which includes a plurality of switching elements and supplies a driving current to the motor; and
a drive control portion which controls the switching elements,
wherein after the power supply switch is changed in a non-conductive state, electric charge accumulated in the capacitor flows into a part of a current path necessary for rotating the motor.

The second invention is characterized in that, in the first invention,
the motor is a brushless motor which rotates by being supplied with multi-phase driving currents, and
the drive control portion controls the switching elements such that, after the power supply switch is changed in the non-conductive state, each of the driving currents of the two phases or more is not zero and the motor does not rotate even supplied with the driving currents.

The third invention is characterized in that, in the second invention, a motor switch is further provided between the motor and the motor driving circuit, wherein wherein the motor switch keeps a conductive state until the electric charge accumulated in the capacitor is discharged completely even after the power supply switch is changed in the non-conductive state.

The fourth invention is characterized by an electric power steering apparatus which is coupled to a power supply in use, including:

a motor which generates a steering assist power to be applied to a steering mechanism of a vehicle;

a power supply switch;

a capacitor for absorbing current ripple;

a motor driving circuit which includes a plurality of switching elements and supplies a driving current to the motor;

a drive control portion which controls the switching elements; and a motor switch which is provided between the motor and the motor driving circuit and configured by a relay element, wherein after the power supply switch is changed in a non-conductive state, electric charge accumulated in the capacitor flows into an exciting coil of the motor switch.

The fifth invention is characterized by, in the fourth invention, further including a switch for controlling the coil which is coupled in series with the exciting coil of the motor switch, wherein the switch for controlling the coil keeps a conductive state until discharge of the electric charge accumulated in the capacitor is completed even after the power supply switch is changed in the non-conductive state.

The sixth invention is characterized in that, in the fourth invention, the motor is a brushless motor which rotates when being supplied with multi-phase driving currents, and the drive control portion controls the switching elements such that, after the power supply switch is changed in the non-conductive state, each of the driving currents of all the phases becomes zero.

Effects of the Invention

According to the first invention, at the time of turning the power supply off, the electric charge accumulated in the capacitor for absorbing the current ripple is discharged via a part of the current path necessary for rotating the motor. Thus, the electric charge accumulated in the capacitor for absorbing the current ripple can be discharged without using a dedicated circuit. Therefore, the electric power steering apparatus can be reduced in its size and cost and further an amount of the consumption current of the electric power steering apparatus can be reduced.

According to the second invention, at the time of turning the power supply off, although the driving currents are supplied to the motor from the motor driving circuit, the motor does not rotate even supplied with the driving currents. In this case, the electric charge accumulated in the capacitor for absorbing the current ripple is discharged via the motor driving circuit and the motor windings. Thus, the electric charge accumulated in the capacitor for absorbing the current ripple can be discharged without using a dedicated circuit while preventing such a phenomenon that the motor rotates unnecessarily to thereby apply an unnecessary steering assist power to the steering mechanism of the vehicle.

According to the third invention, in the electric power steering apparatus having the motor switch, since the motor switch is kept in the conductive state also after the power supply is turned off, the driving currents insufficient for rotating the motor can be supplied to the motor. In this case, the electric charge accumulated in the capacitor for absorbing the current ripple is discharged via the motor driving circuit, the motor switch and the motor windings. Thus, also in the electric power steering apparatus having the motor switch, the electric charge accumulated in the capacitor for absorbing the current ripple can be discharged without using a dedicated circuit.

According to the fourth invention, in the electric power steering apparatus having the motor switch configured by the relay element, when the current path passing through the exciting coil of the motor switch is maintained after the power supply is turned off, the electric charge accumulated in the capacitor for absorbing the current ripple can be discharged through the exciting coil of the motor switch. Thus, in the electric power steering apparatus having the motor switch configured by the relay element, the electric charge accumulated in the capacitor for absorbing the current ripple can be discharged without supplying the driving currents to the motor and further without using a dedicated circuit.

According to the fifth invention, since the switch for controlling the coil keeps the conductive state also after the power supply is turned off, the current path passing through the exciting coil of the motor switch is maintained and the electric charge accumulated in the capacitor for absorbing the current ripple can be discharged through the exciting coil of the motor switch.

According to the sixth invention, after the power supply is turned off, since the driving currents are not supplied to the motor, the motor does not rotate. Further, the electric charge accumulated in the capacitor for absorbing the current ripple is discharged via the exciting coil of the motor switch. Thus, the electric charge accumulated in the capacitor for absorbing the current ripple can be discharged without using a dedicated circuit while preventing such a phenomenon that the motor rotates unnecessarily to thereby apply an unnecessary steering assist power to the steering mechanism of the vehicle.

Figure 1:
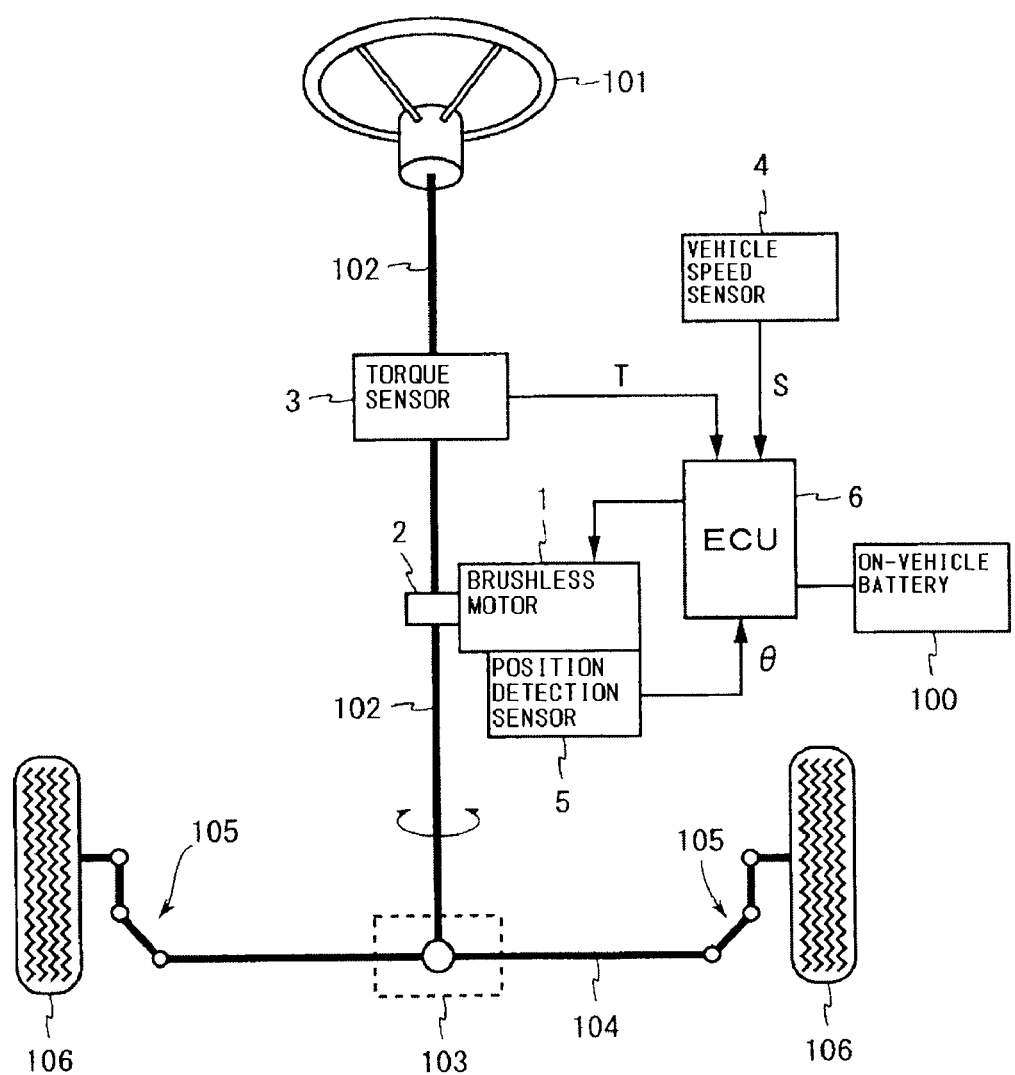
FIG. 1 is a schematic diagram showing the configuration of an electric power steering apparatus according to the first embodiment of the invention.

1 brushless motor
11 power supply relay
12 capacitor
13 motor driving circuit
14 motor relay (motor switch)
15 drive control portion
21 exciting coil
22 switch (switch for controlling coil)

BEST MODE FOR CARRYING OUT THE INVENTION

FIG. 1 is a schematic diagram showing the configuration of an electric power steering apparatus according to an embodiment of the invention together with the configuration of a vehicle related thereto. The electric power steering apparatus shown in FIG. 1 is an electric power steering apparatus of a column assist type including a brushless motor 1, a reduction gear 2, a torque sensor 3, a vehicle speed sensor 4, a position detection sensor 5 and an electronic control unit (hereinafter referred to an ECU) 6.

As shown in FIG. 1, a steering wheel 101 is fixedly attached to the one end of a steering shaft 102 and the other end of the steering shaft 102 is coupled to a rack shaft 104 via a rack pinion mechanism 103. The both ends of the rack shaft 104 are coupled to wheels 106 via coupling members 105 each configured by a tie-rod and a steering knuckle arm. When a driver rotates the steering wheel 101, the steering shaft 102 rotates and so the rack shaft 104 moves reciprocally in accordance with the rotation of the steering shaft. The direction of the wheel 106 changes in accordance with the reciprocal movement of the rack shaft 104.

The electric power steering apparatus performs the following steering assist in order to reduce a load of a driver. The torque sensor 3 detects a steering torque T applied to the steering shaft 102 by the operation of the steering wheel 101. The vehicle speed sensor 4 detects a vehicle speed S. The position detect ion sensor 5 detects the rotational position (angle) θ of the rotor of the brushless motor 1. The position detection sensor 5 is configured by a resolver, for example.

The ECU 6 is supplied with electric power and drives the brushless motor 1 based on the steering torque T, the vehicle speed S and the angle θ. The brushless motor 1 generates a steering assist power when driven by the ECU 6. The reduction gear 2 is provided between the brushless motor 1 and the steering shaft 102. The steering assist power generated by the brushless motor 1 acts to rotate the steering shaft 102 via the reduction gear 102.

As a result, the steering shaft 102 is rotated by both the steering torque applied to the steering wheel 101 and the steering assist power generated by the brushless motor 1. In this manner, the electric power steering apparatus performs the steering assist by applying the steering assist power generated by the brushless motor 1 to the steering mechanism of the vehicle.

The electric power steering apparatus according to the embodiment of the invention is characterized by the control circuit (motor control circuit) of the brushless motor 1. Thus, the explanation will be made as to the motor control circuit contained in the electric power steering apparatus according to the respective embodiments. The invention can be applied not only to the electric power steering apparatus of a column assist type but also to the electric power steering apparatuses of a pinion assist type and a rack assist type.

FIRST EMBODIMENT

Figure 2:
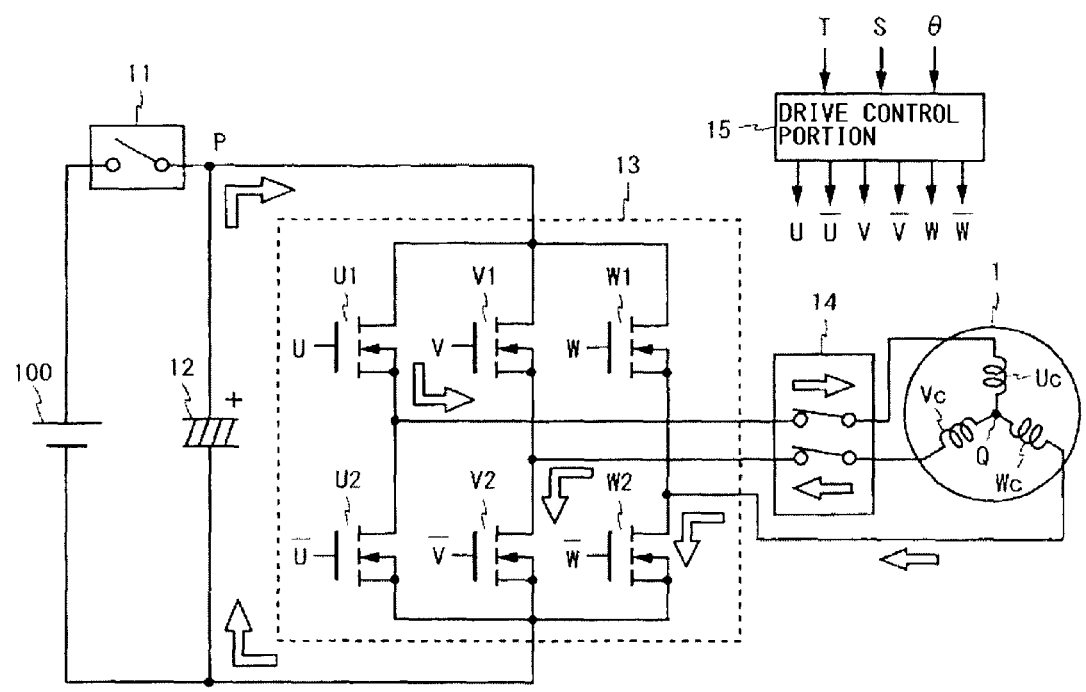
FIG. 2 is a circuit diagram of a motor control circuit contained in the electric power steering apparatus according to the first embodiment of the invention.

FIG. 2 is a circuit diagram of the motor control circuit contained in the electric power steering apparatus according to the first embodiment of the invention. The motor control circuit shown in FIG. 2 includes a power supply relay 11, a capacitor 12, a motor driving circuit 13 and a motor relay 14 and drives the brushless motor 1. The motor control circuit is contained within the ECU 6 and used in a manner of being coupled to an on-vehicle battery 100 as a power supply.

In FIG. 2, the brushless motor 1 is a three-phase brushless motor having three-phase windings (a U-phase coil Uc, a V-phase coil Vc and a W-phase coil Wc). The power supply relay 11 is a power supply switch for selectively connecting the power supply to the motor control circuit. The motor relay 14 is a motor switch for selectively connecting the motor driving circuit 13 to the brushless motor 1. Each of the power supply relay 11 and the motor relay 14 is placed in an on-state (a conductive state) when the electric power steering apparatus is operated and placed in an off-state (a non-conductive state) when the electric power steering apparatus is stopped.

The motor driving circuit 13 includes six MOS-FETs (U1, U2, V1, V2, W1, W2) as switching elements. As shown in FIG. 2, the MOS-FETs U1 and U2 are coupled in series, the MOS-FETs V1 and V2 are coupled in series and also the MOS-FETs W1 and W2 are coupled in series. The three circuits each formed by coupling the corresponding two of the six MOS-FETs in series are provided in parallel between the two power supply lines. The coupling point between the MOS-FETs U1 and U2 is coupled to the one end of the U-phase coil Uc via the motor relay 14. The coupling point between the MOS-FETs V1 and V2 is coupled to the one end of the V-phase coil Vc via the motor relay 14. The coupling point between the MOS-FETs W1 and W2 is coupled to the one end of the W-phase coil Wc via the motor relay 14. The other ends of the three-phase windings of the brushless motor 1 are coupled to a common coupling point (hereinafter called a neutral point Q).

A drive control portion 15 controls the six MOS-FETs contained in the motor driving circuit 13. To be more concrete, the drive control portion 15 receives the steering torque T, the vehicle speed S and the angle θ. The drive control portion 15 determines target values (target currents) of the three phase driving currents (U-phase current, V-phase current and W-phase current) to be supplied to the brushless motor 1 and outputs PWM signals for coinciding currents being measured (measured currents) with the target currents, respectively. The PWM signals of the respective phases and the negation signals thereof output from the drive control portion 15 are supplied to the gate terminals of the six MOS-FETs contained in the motor driving circuit 13, respectively.

The PWM signal is obtained by determining the target current, then obtaining a current value for coinciding the measured current with the target current and subjecting a control signal representing the current value thus obtained to the PWM conversion. The processing of determining the target currents and obtaining the current values for coinciding the measured currents with the target currents is performed by using a rotation coordinate system (d-q coordinate system) which rotates together with the rotor of the brushless motor 1 and thereafter the current values of the d-q coordinate system are converted into the current values of the three-phase AC coordinate system (uvw coordinate system). The processings other than the PWM conversion among the processings of the drive control portion 15 are performed by the software of a microcomputer contained in the ECU 6.

Each of the six MOS-FETs contained in the motor driving circuit 13 is controlled by the corresponding PWM signal output from the drive control portion 15 in a manner that the MOS-FET is placed in an on state when the PWM signal is at a first level (for example, a high level) and placed in an off state when the PWM signal is at a second level (for example, a low level). The drive control portion 15 controls the six MOS-FETs contained in the motor driving circuit 13 in a manner that the three-phase driving currents differ in their phases by $2\pi/3$ from one another and each of which changes in a sine wave manner. Thus, the rotor of the brushless motor 1 is supplied with a torque and so the brushless motor 1 can be rotated.

The capacitor 12 is provided between the two power supply lines. The capacitor 12 accumulates electric charge and discharges the electric charge thus accumulated when the current flowing into the motor driving circuit 13 from the power supply is insufficient, whereby the capacitor 12 function as a capacitor for absorbing the current ripple.

At the time of stopping the operation of the electric power steering apparatus, the six MOS-FETs contained in the motor driving circuit 13 are all controlled so as to be once placed in the off state. Thus, all the three-phase driving currents are set to zero and so the brushless motor 1 stops the rotation. Thereafter, the power supply relay 11 is placed in the off state to thereby interrupt the supply of the electric power to the motor control circuit from the power supply.

Unlike the electric power steering apparatus of the related art, in the electric power steering apparatus according to the embodiment, the motor relay 14 is kept in the on state until a condition explained below is satisfied after the motor relay 14 is placed in the off state.

During a condition that the power supply relay 11 is in the turned-off state and the motor relay 14 is in the turned-on state, the drive control portion 15 controls the six MOS-FETs contained in the motor driving circuit 13 so that each of the driving currents of the two phases or more is not zero and the brushless motor 1 does not rotate even supplied with these driving currents. To be more concrete, the drive control portion 15 sets the target value of a d-axis current to a predetermined value other than 0 (for example, 10A) and sets the target value of a q-axis current to zero and thereafter performs the processing same as that in the case of operating the brushless motor 1 (that is, a processing of obtaining the current for coinciding the measured current with the target current and subjecting the control signal representing the current value thus obtained to the PWM conversion).

The q-axis current acts to rotate the brushless motor 1 (apply a torque to the rotor), whilst the d-axis current does not influence on the rotation of the brushless motor 1 (does not apply a torque to the rotor). Thus, even if the three-phase driving currents obtained by setting the target value of the q-axis current to zero are supplied to the brushless motor 1, the brushless motor 1 does not rotate.

On the other hand, when the three-phase driving currents are obtained by setting the target value of the d-axis current to a value other than zero, the two-phase or three-phase currents do not become zero. When each of the two-phase driving currents is not zero, each of the two MOS-FETs of the six MOS-FETs contained in the motor driving circuit 13 is controlled so as to be the on-state and each of the remaining four MOS-FETs is controlled so as to be the off-state. When each of the three-phase driving currents is not zero, each of the three MOS-FETs of the six MOS-FETs contained in the motor driving circuit 13 is controlled so as to be the on-state and each of the remaining three MOS-FETs is controlled so as to be the off-state. In each of these cases, the electric charge accumulated in the capacitor 12 is discharged via the MOS-FETs each in the on-state, the motor relay 14 and the windings of the brushless motor 1.

For example, in the case where the U-phase current is positive, the V-phase current is negative and the W-phase current is zero (an example where each of the two-phase driving currents is not zero), each of the MOS-FETs U1, V2 is controlled so as to be the on-state and each of the MOS-FETs U2, V1, W1, W2 is controlled so as to be the off-state. In this case, the electric charge accumulated in the capacitor 12 is discharged via a current path formed by the MOS-FET U1, the one switch (a switch coupled to the U-phase coil Uc) of the motor relay 14, the U-phase coil Uc, the V-phase coil Vc, the other switch (a switch coupled to the V-phase coil Vc) of the motor relay 14 and the MOS-FET V2.

In the case where the U-phase current is positive, the V-phase current is negative and the W-phase current is negative (an example where each of the three-phase driving currents is not zero), each of the MOS-FETs U1, V2, W2 is controlled so as to be the on-state and each of the MOS-FETs U2, V1, W1 is controlled so as to be the off-state. In this case, the electric charge accumulated in the capacitor 12 is discharged via a current path formed by the MOS-FET U1, the one switch (the switch coupled to the U-phase coil Uc) of the motor relay 14, the U-phase coil Uc, the neutral point Q, the V-phase coil Vc, the other switch (the switch coupled to the V-phase coil Vc) of the motor relay 14 and the MOS-FET V2 and also another current path formed by the MOS-FET U1, the one switch (the switch coupled to the U-phase coil Uc) of the motor relay 14, the U-phase coil Uc, the neutral point Q, the W-phase We and the MOS-FET W2 (that is, the paths shown by outline arrows). The current path for discharging the electric charge accumulated in the capacitor 12 differs depending on the angle θ at the time where the power supply relay 11 is placed on the off-state.

When it is detected that the electric charge accumulated in the capacitor 12 is discharged and the voltage of the one electrode (the voltage at a point P shown in FIG. 2) of the capacitor 12 reduced sufficiently, the motor relay 14 is placed in the off-state. In this manner, the motor relay 14 keeps the on-state until the electric charge accumulated in the capacitor 12 is discharged completely even after the power supply relay 11 is placed in the off-state.

As explained above, in the electric power steering apparatus according to the embodiment, at the time of turning the power supply off, the electric charge accumulated in the capacitor 12 for absorbing the current ripple is discharged via a part of the current path necessary for rotating the motor (to be concrete, the MOS-FETs each in the on-state, the motor relay 14 and the windings of the brushless motor 1). Thus, the electric charge accumulated in the capacitor 12 for absorbing the current ripple can be discharged without using a dedicated circuit. Therefore, the electric power steering apparatus can be reduced in its size and cost and further an amount of the consumption current of the electric power steering apparatus can be reduced.

Further, the drive control portion 15 controls the six MOS-FETs contained in the motor driving circuit 13 so that, at the time of turning the power supply off, each of the driving currents of the two phases or more is not zero and the brushless motor 1 does not rotate even supplied with these driving currents. Thus, at the time of turning the power supply off, although the driving currents are supplied to the brushless motor 1 from the motor driving circuit 13, the brushless motor 1 does not rotate even if the driving current is supplied. Therefore, it is possible to prevent such a phenomenon that the brushless motor 1 rotates unnecessarily to thereby apply an unnecessary steering assist power to the steering mechanism of the vehicle.

Further, the electric power steering apparatus according to the embodiment includes the motor relay 14. Even in this case, the driving currents not rotating the brushless motor 1 can be supplied to the brushless motor 1 by keeping the motor relay 14 in the turned-off state also after turning the power supply off.

SECOND EMBODIMENT

Figure 3:
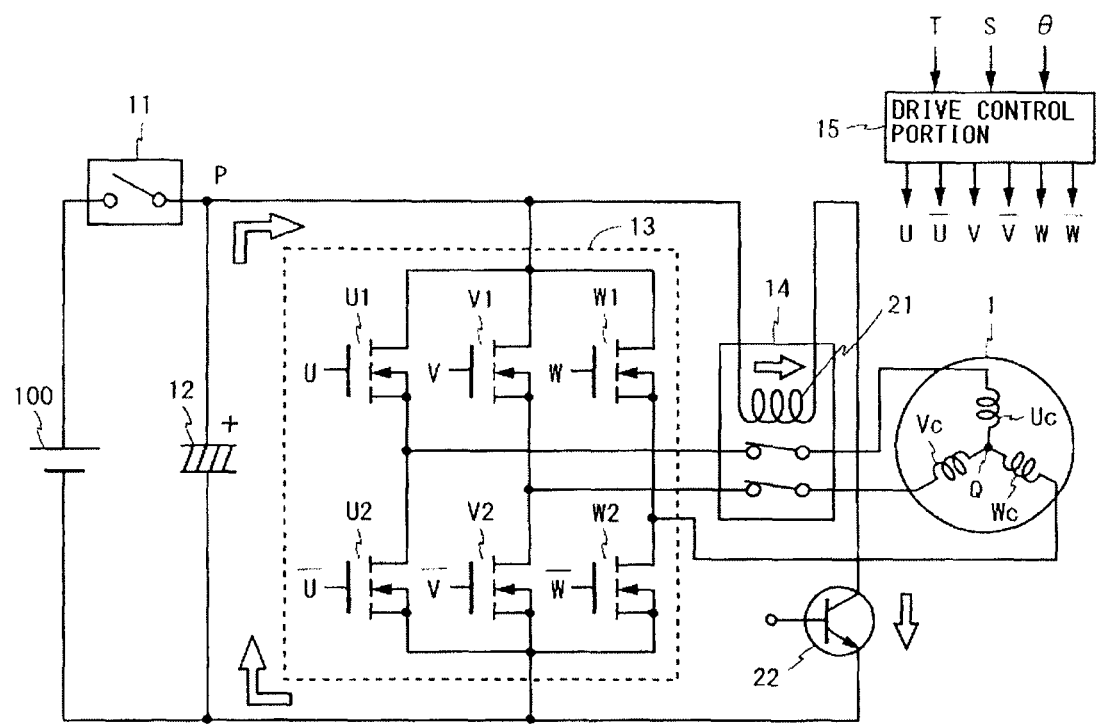
FIG. 3 is a circuit diagram of a motor control circuit contained in an electric power steering apparatus according to the second embodiment of the invention.
Figure 4A:
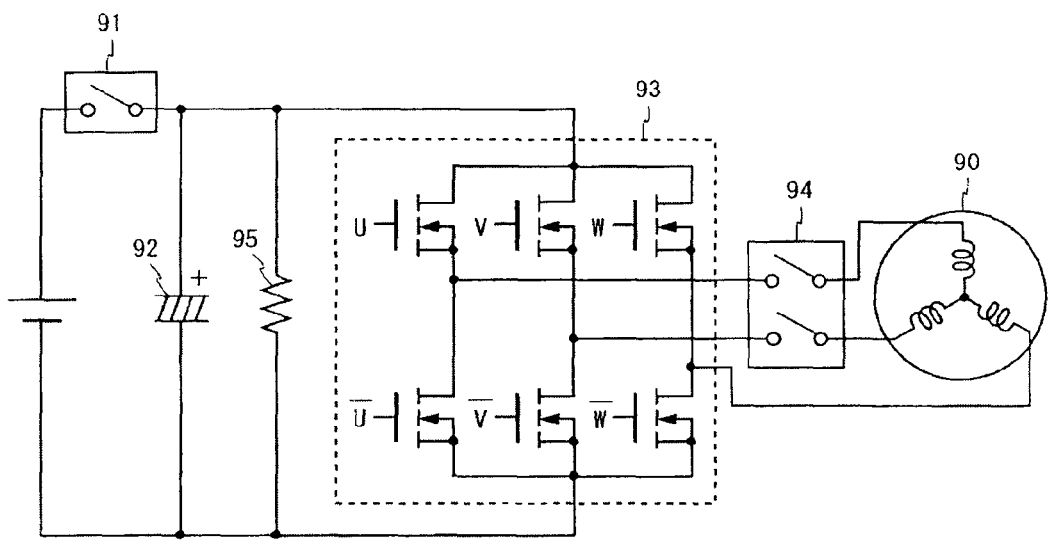
FIGS. 4A and 4B are circuit diagrams of a motor control circuit contained in an electric power steering apparatus of a related art.
Figure 4B:
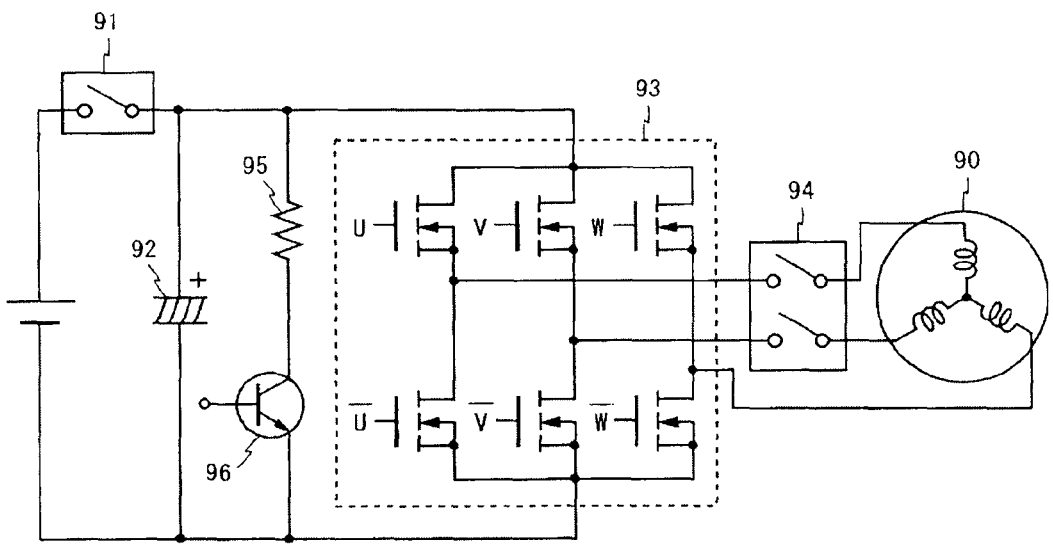

FIG. 3 is a circuit diagram of the motor control circuit contained in the electric power steering apparatus according to the first embodiment of the invention. The motor control circuit shown in FIG. 3 shows the detailed configuration of the motor relay 14 as to the motor control circuit shown in FIG. 2.

The motor relay 14 is configured by a relay element having an exciting coil 21. The motor relay 14 is placed in an on-state when a current of a predetermined amount or more is flowing through the exciting coil 21 and placed in an off-state in the other case. A switch 22 is provided as a coil control switch for controlling as to whether or not a current is to be supplied to the exciting coil 21. The exciting coil 21 and the switch 22 are connected in series and are provided between the two power supply lines.

Each of the power supply relay 11 and the switch 22 is placed in the on-state when the electric power steering apparatus is operated but placed in the off-state when the electric power steering apparatus is stopped. Thus, when the electric power steering apparatus is stopped, since the exciting coil 21 is not supplied with the current, the motor relay 14 is placed in the off-state. In contrast, when the electric power steering apparatus is operated, since the exciting coil 21 is supplied with the current, the motor relay 14 is placed in the on-state. When each of the power supply relay 11 and the switch 22 is placed in the on-state, the motor control circuit shown in FIG. 3 operates as described in the first embodiment.

At the time of stopping the operation of the electric power steering apparatus, each of the six MOS-FETs contained in the motor driving circuit 13 is controlled so as to be turned off and thereafter kept in the off-state. Thus, each of the three-phase driving currents becomes zero and so the brushless motor 1 stops the rotation. Thereafter, the power supply relay 11 is turned off and hence the supply of the electric power from the power supply to the motor control circuit is interrupted.

In the electric power steering apparatus according to this embodiment, even after the power supply relay 11 is turned off, each of the switch 22 and the motor relay 14 is kept in the off state until the condition described later is satisfied. While the power supply relay 11 is in the off-state and the switch 22 is in the on-state, the electric charge accumulated in the capacitor 12 is discharged via the exciting coil 21 and the switch 22. In FIG. 3, a current path for discharging the electric charge accumulated in the capacitor 12 is shown by outline arrows.

When it is detected that the electric charge accumulated in the capacitor 12 is discharged and the voltage of the one electrode (the voltage at a point P shown in FIG. 3) of the capacitor 12 reduced sufficiently, the switch 22 is placed in the off-state. Thus, the motor relay 14 is also placed in the off-state. Alternatively, there may arise a case that the electric charge accumulated in the capacitor 12 is discharged and the current flowing into the exciting coil 21 reduces, whereby the motor relay 14 is also placed in the off-state before the switch 22 is placed in the off-state. In any case, the motor relay 14 keeps the on-state until the electric charge accumulated in the capacitor 12 is discharged completely even after the power supply relay 11 is placed in the off-state.

As explained above, in the electric power steering apparatus according to the embodiment, at the time of turning the power supply off, the electric charge accumulated in the capacitor 12 for absorbing the current ripple is discharged via the exciting coil 21 of the motor relay 14 and the switch 22. Thus, like the first embodiment, the electric charge accumulated in the capacitor 12 for absorbing the current ripple can be discharged without using a dedicated circuit. Therefore, the electric power steering apparatus can be reduced in its size and cost and further an amount of the consumption current of the electric power steering apparatus can be reduced.

Further, since the switch 22 is kept in the on-state after turning the power supply off, the current path including the exciting coil 21 of the motor relay 14 is maintained, so that the electric charge accumulated in the capacitor 12 for absorbing the current ripple can be discharged via the exciting coil 21 of the motor relay 14 and the switch 22.

Furthermore, since the drive control portion 15 controls the six MOS-FETs contained in the motor driving circuit 13 so that, at the time of turning the power supply off, each of the driving currents of all the phases becomes zero. Thus, after the power supply is turned off, the brushless motor 1 is not supplied with the driving currents and so the brushless motor 1 does not rotate. Therefore, it is possible to prevent such a phenomenon that the brushless motor 1 rotates unnecessarily to thereby apply an unnecessary steering assist power to the steering mechanism of the vehicle.

The method described in the first embodiment may be applied to the electric power steering apparatus having no motor relay 14. Either one of the methods of the first and second embodiments may be applied to the electric power steering apparatus having the motor relay 14, or both the method may be applied thereto.

The invention claimed is:

1. An electric power steering apparatus which is coupled to a power supply in use, comprising:
   a motor which generates a steering assist power to be applied to a steering mechanism of a vehicle;
   a power supply switch;
   a capacitor connected for absorbing current ripple in the power from the power supply;
   a motor driving circuit which includes a plurality of switching elements and supplies a driving current to the motor;
   a drive control portion which controls the switching elements; and
   means for causing an electric charge accumulated in the capacitor to flow into a part of a current path necessary for rotating the motor at a time after the power supply switch is changed in a non-conductive state.

2. The electric power steering apparatus according to claim 1, wherein
   the motor is a brushless motor which rotates by being supplied with multi-phase driving currents, and
   the drive control portion controls the switching elements such that, after the power supply switch is changed in the non-conductive state, all of the driving currents of the two phases or more are not zero and the motor does not rotate even supplied with the driving currents.

3. The electric power steering apparatus according to claim 2 further comprising:
   a motor switch which is provided between the motor and the motor driving circuit,
   wherein the motor switch keeps a conductive state until the electric charge accumulated in the capacitor is discharged completely even after the power supply switch is changed in the non-conductive state.

4. An electric power steering apparatus which is coupled to a power supply in use, comprising:
   a motor which generates a steering assist power to be applied to a steering mechanism of a vehicle;
   a power supply switch;
   a capacitor connected for absorbing current ripple in the power from the power supply;
   a motor driving circuit which includes a plurality of switching elements and supplies a driving current to the motor;

a drive control portion which controls the switching elements; and a motor switch which is provided between the motor and the motor driving circuit and configured by a relay element, wherein after the power supply switch is changed in a non-conductive state, electric charge accumulated in the capacitor flows into an exciting coil of the motor switch.

5. The electric power steering apparatus according to claim 4 further comprising:

a switch for controlling the coil which is coupled in series with the exciting coil of the motor switch, wherein the switch for controlling the coil keeps a conductive state until discharge of the electric charge accumulated in the capacitor is completed even after the power supply switch is changed in the non-conductive state.

6. The electric power steering apparatus according to claim 4, wherein the motor is a brushless motor which rotates when being supplied with multi-phase driving currents, and the drive control portion controls the switching elements such that, after the power supply switch is changed in the non-conductive state, all of the driving currents of all the phases become zero.

* * * * *